US012182176B2

(12) United States Patent
Gandhi et al.

(10) Patent No.: US 12,182,176 B2
(45) Date of Patent: Dec. 31, 2024

(54) SYSTEM AND METHOD FOR INTELLIGENT SYNTHETIC TEST DATA GENERATION

(71) Applicant: Accenture Global Solutions Limited, Dublin (IE)

(72) Inventors: Shashank Kundanmal Gandhi, Pune (IN); Mihir S. Nanal, Pune (IN); Sarang Padmakar Joshi, Pune (IN); Pradnya Desai, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/191,104

(22) Filed: Mar. 28, 2023

(65) Prior Publication Data
US 2024/0330321 A1 Oct. 3, 2024

(51) Int. Cl.
*G06F 16/00* (2019.01)
*G06F 16/28* (2019.01)
*G06F 18/2413* (2023.01)

(52) U.S. Cl.
CPC ...... *G06F 16/285* (2019.01); *G06F 18/24147* (2023.01)

(58) Field of Classification Search
None
See application file for complete search history.

(56) References Cited

U.S. PATENT DOCUMENTS

| 2015/0058459 A1 | 2/2015 | Amendjian et al. |
| 2019/0155989 A1* | 5/2019 | Yasumoto ............. G06Q 10/10 |
| 2021/0263900 A1* | 8/2021 | Joyce .................... G06N 20/00 |
| 2022/0300400 A1 | 9/2022 | Bikkina et al. |

FOREIGN PATENT DOCUMENTS

EP 3893107 A1 10/2021

OTHER PUBLICATIONS

"The extended European search report" for Application No. EP24165135.5-1203, mailed Jul. 30, 2024, 8 pages.
Datprof, "The right test data. In the right place. At the right time", downloaded from the Internet on May 24, 2023, 15 pages. <https://www.datprof.com/>.
Generatedata.com, "Generate test data. Quickly", downloaded from the Internet on May 24, 2023, 2 pages. <https://generatedata.com/>.
Mosty.AI, "Generative AI for tabular data", downloaded from the Internet on May 24, 2023, 16 pages. <https://mostly.ai/>.

* cited by examiner

*Primary Examiner* — Anhtai V Tran
(74) *Attorney, Agent, or Firm* — Mannava & Kang, P.C.

(57) ABSTRACT

The systems and method described provide a dynamic and automated process for producing test data for cloud migrations. Metadata for transformation designs with attribute classification and relationship data can be used to generate an enriched design-driven data set. The test data can then be used to validate infrastructure provisioned in multi-cloud environments and accommodate most cloud providers. The system can avoid tedious testing cycles that use non-relevant test data (i.e., unrelated to the specific design requirements).

20 Claims, 9 Drawing Sheets

SYSTEM AND METHOD FOR INTELLIGENT SYNTHETIC TEST DATA GENERATION

TECHNICAL FIELD

The present disclosure generally relates to intelligent enrichment of test data, and more particularly to producing intelligent synthetic test data paradigms for design validation of cloud transformations and migrations.

BACKGROUND

Cloud computing has seen increasing use for a variety of reasons, including cost savings, ease of maintenance, scalability, and versatility. Cloud computing provides many different types of cloud applications, such as information as a service (IaaS) applications (e.g., information technology applications, networking applications, data storage applications, etc.), platform as a service (PaaS) applications (e.g., hardware applications, operating system applications, etc.), and software as a service (SaaS) applications (e.g., email applications, word processing applications, image applications, etc.).

Cloud applications have several attributes that make them different than typical software applications. For example, cloud applications execute on virtualized hardware and a software stack that can be moved and replicated between physical machines as needed, share common physical resources with other cloud applications, are built to be highly scalable in real-time, and are predominately accessed using standard network protocols. Furthermore, cloud applications use hypertext markup language (HTML) and other web technologies for providing front-end and management user interfaces, provide application programming interfaces (APIs) for integration and management, consume third-party APIs for providing common services and functionality, and tend to use no structured query language (SQL) data stores.

These attributes make testing cloud applications very difficult and much different than testing typical software applications. For example, since cloud applications execute on hardware that is controlled by the cloud provider and is shared with other applications, testing of cloud applications requires testing performance and scalability in environments similar to the environments of the cloud applications. Since cloud applications usually share resources and infrastructure with other cloud applications, testing of cloud applications requires providing extra consideration to data privacy and access control issues. Furthermore, since cloud applications consume external APIs and services for providing functionality for the external APIs, testing of cloud applications requires testing of the external APIs and the services providing the functionality for the external APIs. Thus, testing of cloud applications consumes vast amounts of time, resources, and capital.

There is a need in the art for a system and method that addresses the shortcomings discussed above.

SUMMARY

The proposed systems and methods describe a dynamic and automated process for producing test data to implement in software testing for cloud migrations. The system and method solve the problems discussed above by providing a mechanism by which to incorporate metadata for transformation designs with attribute classification and relationship data to generate an enriched design-driven data set. The test data can then be implemented in software testing to validate infrastructure provisioned in multi-cloud environments and accommodate most cloud providers. These features (among others described) are specific improvements in way that the underlying computer system operates. In addition, the proposed systems and methods solve technical challenges with cloud infrastructure testing and validation, as well as software development targeted for transformation, by generating and implementing test data to identify and fix faulty functions/processes in software applications. The improvements facilitate a more efficient, accurate, consistent, and precise building of resources that operate properly immediately upon entering the production environment. The improved functioning of the underlying computer hardware itself achieves further technical benefits. For example, the system avoids tedious testing cycles that use non-relevant test data (i.e., unrelated to the specific design requirements), reduces manual intervention, accelerates the timeline for successful completion of a system's cloud migration, and reduces the possibility for human error, therefore increasing infrastructure instantiation efficiency and reduces wait times for correct resource setup and execution.

In one aspect, the disclosure provides a computer implemented method for producing enriched test data. The method includes a first step of receiving, at a feature extraction module, a first design dataset for a cloud transformation, and a second step of extracting, at the feature extraction module, at least a first set of attributes from the first design dataset in a first data file. In addition, the method includes a third step of receiving, at an attribute classification module, the first data file, and a fourth step classifying, at the attribute classification module, each attribute in the first data file as falling under at least one attribute type to produce a first classification dataset. A fifth step includes receiving, at an attribute relationship module, the first data file, and a sixth step includes identifying, at the attribute relationship module, a transformation relationship for each attribute in the first data file to produce a first relationship dataset. Furthermore, the method includes a seventh step of receiving, at a data engine, input including the first data file, the first classification dataset, the first relationship dataset, and a metadata set associated with the cloud transformation design, and an eighth step of automatically creating, at the data engine and based on the input, a design-specific test dataset for performing tests on software undergoing a cloud transformation.

In another aspect, the disclosure provides a non-transitory computer-readable medium storing software comprising instructions executable by one or more computers which, upon such execution, cause the one or more computers to produce enriched test data by performing the following: (1) receive, at a feature extraction module, a first design dataset for a cloud transformation; (2) extract, at the feature extraction module, at least a first set of attributes from the first design dataset in a first data file; (3) receive, at an attribute classification module, the first data file; (4) classify, at the attribute classification module, each attribute in the first data file as falling under at least one attribute type to produce a first classification dataset; (5) receive, at an attribute relationship module, the first data file; (6) identify, at the attribute relationship module, a transformation relationship for each attribute in the first data file to produce a first relationship dataset; (7) receive, at a data engine, input including the first data file, the first classification dataset, the first relationship dataset, and a metadata set associated with the cloud transformation design; and (8) automatically create, at the data engine and based on the input, a design-specific test dataset for performing tests on software undergoing a cloud transformation.

In yet another aspect, the disclosure provides a system for producing enriched test data, the system comprising one or more computers and one or more storage devices storing instructions that may be operable, when executed by the one or more computers, to cause the one or more computers to: (1) receive, at a feature extraction module, a first design dataset for a cloud transformation; (2) extract, at the feature extraction module, at least a first set of attributes from the first design dataset in a first data file; (3) receive, at an attribute classification module, the first data file; (4) classify, at the attribute classification module, each attribute in the first data file as falling under at least one attribute type to produce a first classification dataset; (5) receive, at an attribute relationship module, the first data file; (6) identify, at the attribute relationship module, a transformation relationship for each attribute in the first data file to produce a first relationship dataset; (7) receive, at a data engine, input including the first data file, the first classification dataset, the first relationship dataset, and a metadata set associated with the cloud transformation design; and (8) automatically create, at the data engine and based on the input, a design-specific test dataset for performing tests on software undergoing a cloud transformation.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Design and production of compliant, high-quality test data has presented a significant challenge in cloud migration project management and execution. The lack of ready-to-use quality test data and the absence of a reliable and effective process for acquiring or creating test data means a reliance on a paradigm that is associated with defect leakage, which can lead to negative impacts on delivery quality and project timelines. For example, current processes rely on a design stage where function mapping documents (FMD), which hold design for the transformation logic, are fed to human developers, who manually mock unit test data. In some cases, these human testers manually generate test data for phases of software development including product testing, user acceptance testing, and performance testing, among others. This approach is further limited by clients who are uncomfortable with sharing production data for unit testing and/or product testing, for example due to data privacy concerns and regulatory compliance standards like the General Data Protection Regulation (GDPR). In some cases, clients must also comply with globally stricter policies on data location, and refrain from providing a complete design coverage. Furthermore, conventionally available test data generators are highly limited and static, typically generating random test data driven by a data model rather than the project's transformation design. There remains a strong need for a data enrichment solution that is functional and valuable across all testing phases (e.g., Unit Testing, Product Testing, User Acceptance Testing, etc.).

The proposed systems and methods are directed to enriching and improving test data completeness from a design perspective for cloud transformations by analyzing the transformation rules in the migration design. The proposed embodiments can leverage machine learning (ML) techniques to ensure the production of non-random test data, dynamically driven by a given design and data model, that is required for various testing phases is compliant and aligned to the design transformations while also ensuring appropriate coverage of the design by use of metadata. This incorporation of metadata into the system and process provides a greatly reduced defect leakage across testing phases, improves confidence in the quality of the test data, helps unify the testing process, and accelerates the generation of test data and the overall migration.

Figure 1:
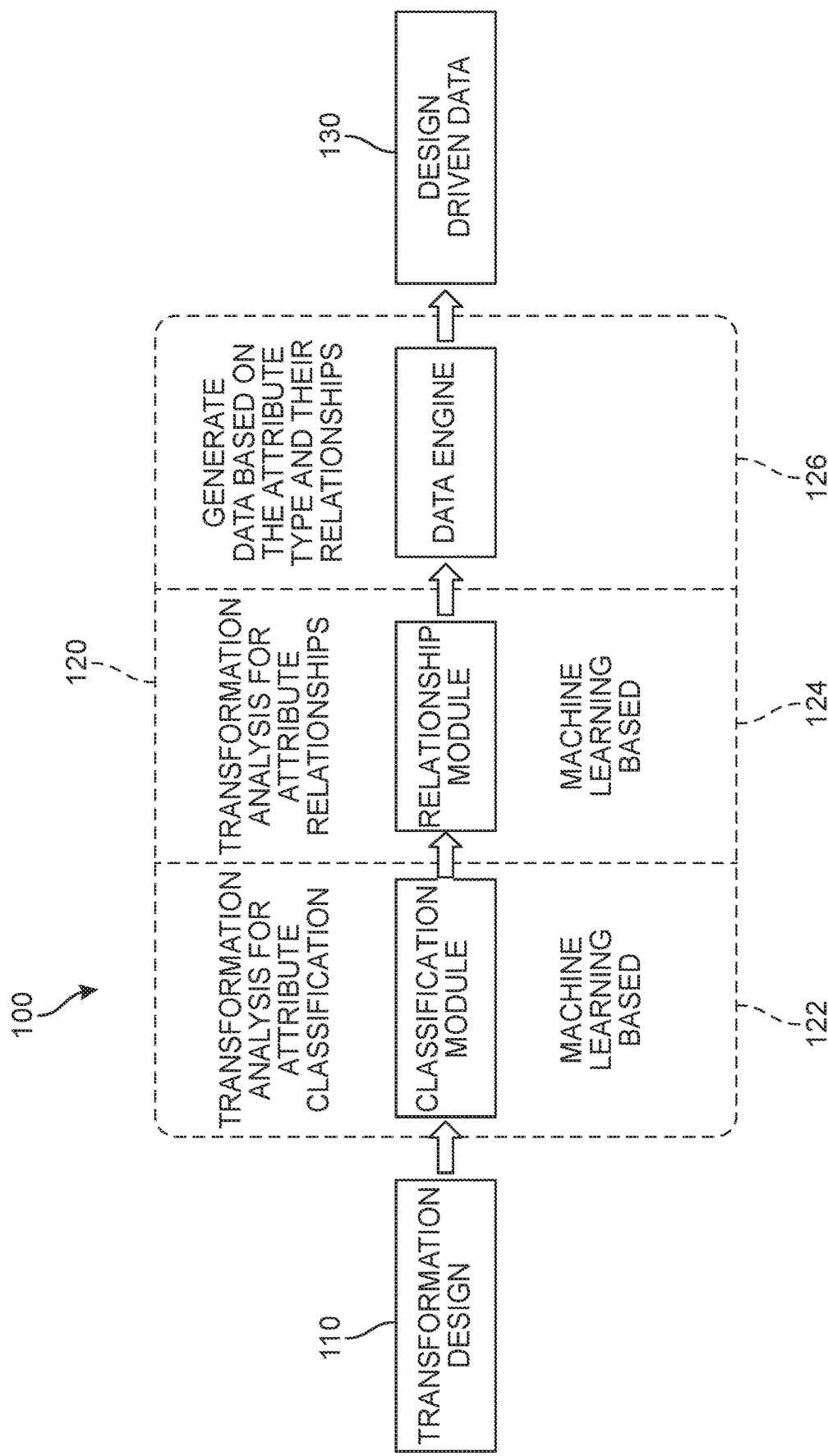
FIG. 1 is an overview of an embodiment of a process for an automated production of design-driven data.

In different embodiments, the proposed systems and systems can be configured to intelligently analyze the transformation rules in a design, as well as recognize and define the range of interrelationships between attributes and transformation rules that are associated with the attributes, in order to generate test data. Referring first to FIG. 1, an overview of the proposed embodiments is depicted. As shown in FIG. 1, a synthetic test data generation process 100 can include the input of a desired transformation design 110 into an enriched data production system ("system") 120. In different embodiments, the system 120 can be understood to include three modules: an attribute classification module 122 that employs a first ML model (e.g., an ML model that implements transformation analysis for classification, or "first ML model"), an attribute (inter)relationship determination module 124 that employs a second ML model (e.g., an ML model that implements transformation analysis for attribute relationships, or "second ML model"), and a transformation-driven intelligent data engine ("data engine") 126. In some embodiments, the attribute classification module 122 can perform transformation analysis on the inputted transformation design 110. Using ML techniques, the attribute classification module 122 can classify the input design attributes, as will be discussed in further detail in FIG. 3. Furthermore, in some embodiments, the relationship determination module 124 can map out the interrelationships between the various attributes, for example as defined by the attribute classification module 122. Finally, in some embodiments, the data engine 126 can generate design-compliant test data ("design-driven data") 130 that is structured to fulfill the specific needs of the current project design, based on the identified attribute types and their relationships. It can be appreciated that this process is dynamic, with different test data being produced for each design that is inputted.

Figure 2:
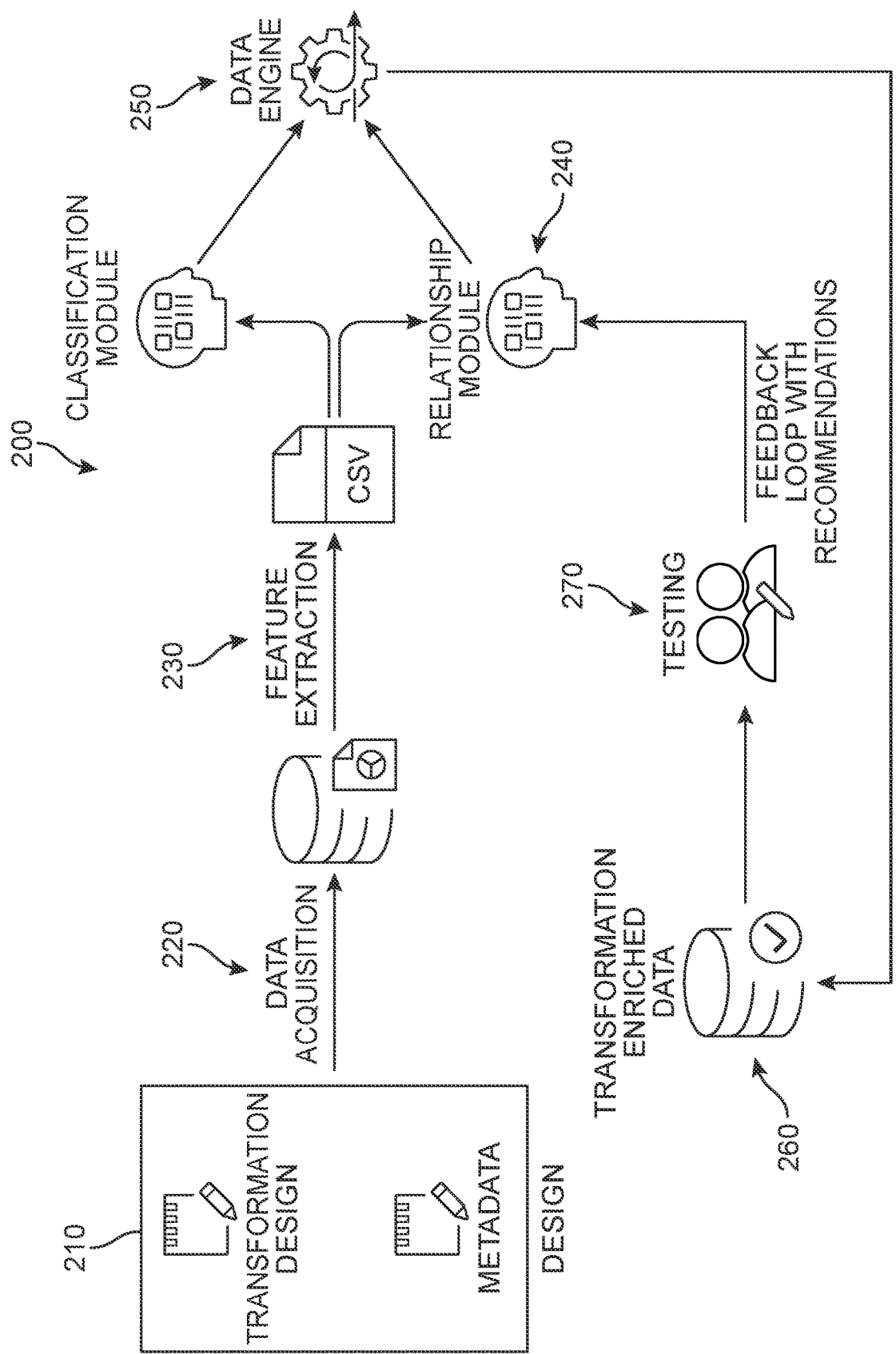
FIG. 2 is a high-level view of a technical architecture for a test data enrichment generation system, according to an embodiment.

Referring now to FIG. 2, a high-level view of an embodiment of a flow through a technical architecture 200 ("architecture") 200 for transformation enriched data testing is shown. As a general matter, the proposed systems can provide data-generation for migrations across a variety of cloud platforms. Some examples include but are not limited to AWS®, Azure®, GCP®, Oracle®, and others. In addition, embodiments of the proposed system can be built using a wide range of programming languages, including but not limited to Python, Go, Ruby, Java or C.Net. Furthermore, the system can work with available test management tools, such as MF Octane, qTest, Zephyr, SpiraTeam, Rally, JIRA, Polarion, CodeBeamer, and other application life cycle management (ALM) tools for storing test cases and test execution results. The system can also produce and reuse test data and execute different combinations across many different test data formats (e.g., JSON, CSV, YAML, Excel®, etc.).

In FIG. 2, the system initially receives input 210 including descriptions of the transformation design(s) and associated metadata as part of a data acquisition process during a first stage 220. As a general matter, metadata can refer to data that describe the properties or characteristics of end-user data and the context of those data. Next, features from the inputted data can be extracted in a second stage 230, and outputted in a JSON, CSV, YAML, Excel®, or other data file format. The extracted features can then be passed to both the classification module and relationships module in a third stage 240, which will classify attributes and relationships that are then submitted to and received by the data engine in a fourth stage 250. The data engine generates transformation enriched test data in a fifth stage 260, which can be used throughout the varied and multiple phases of testing (sixth stage 270). Furthermore, in different embodiments, the results of the testing and associated cyclical feedback from reviewers or other testers (e.g., during unit testing or product testing) can be sent back to the classification module and relationships module to iteratively (e.g., with each round of feedback) improve the accuracy of their ML model outputs (e.g., providing a continuous feedback loop) by self-learning.

Figure 3:
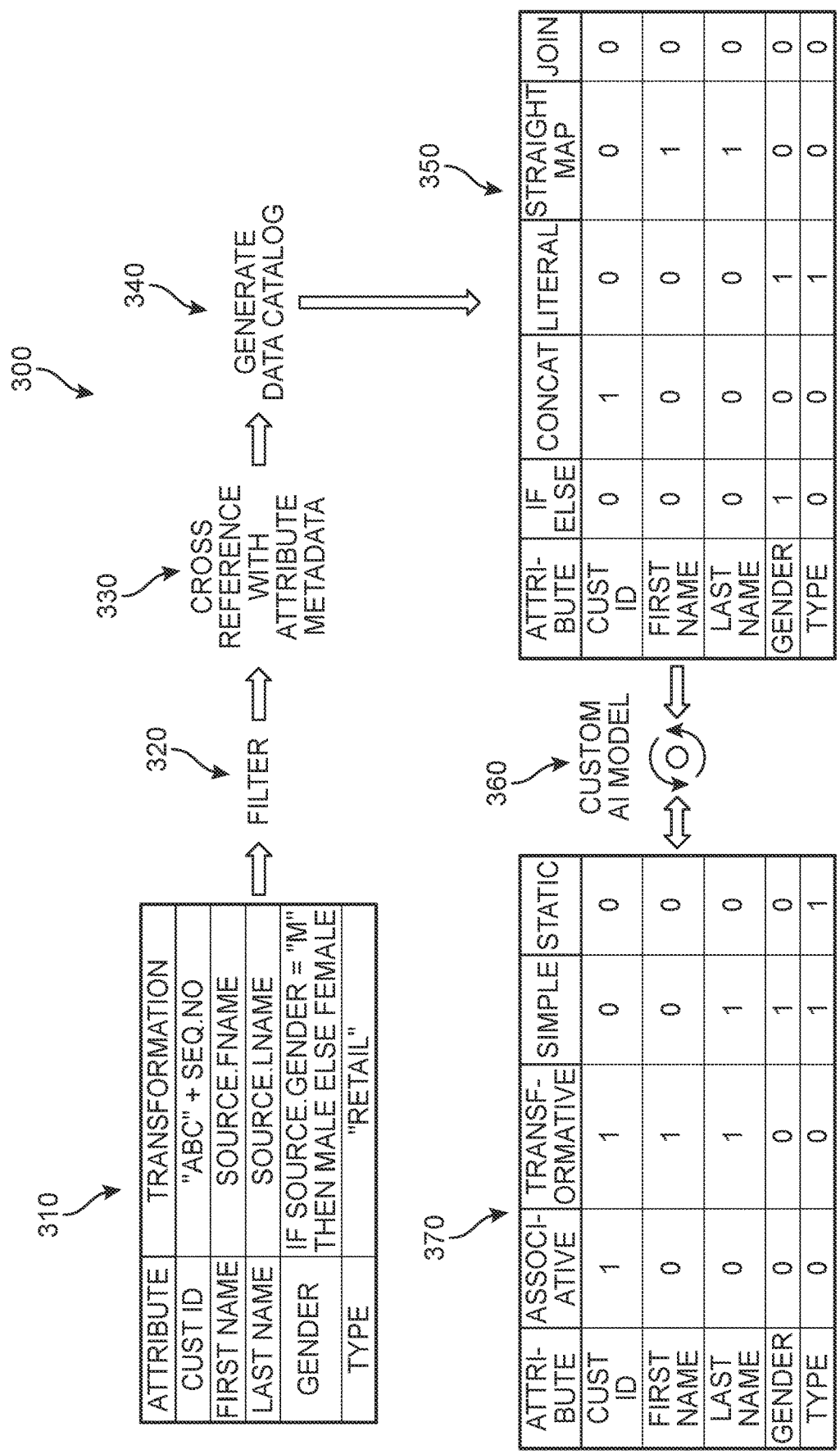
FIG. 3 is a schematic diagram of a process for classification of attributes with one or more attribute types by an attribute classification module, according to an embodiment.
Figure 4:
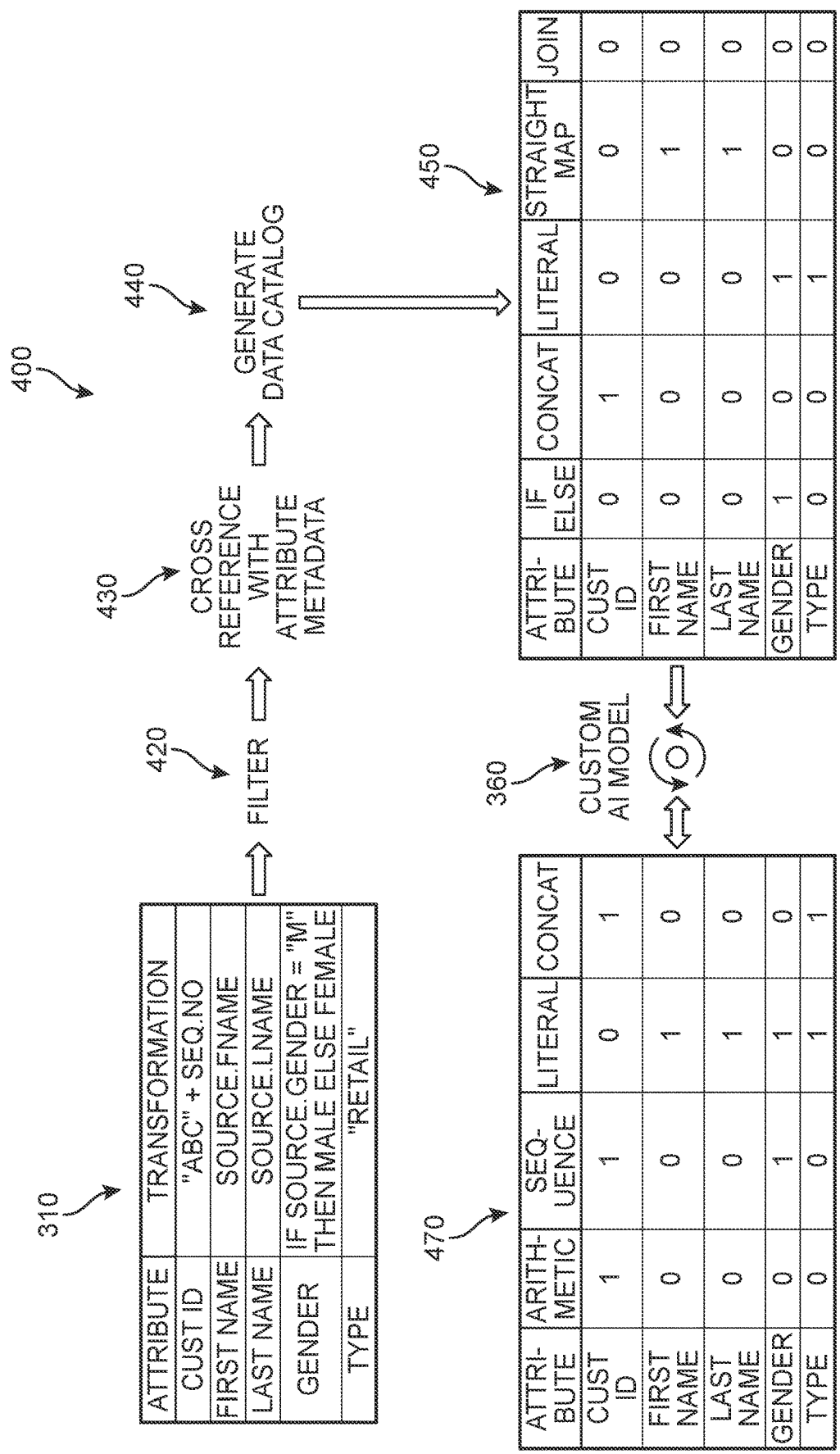
FIG. 4 is a schematic flow diagram of a process for identification of transformation function relationships representing an attribute by a relationship determination module, according to an embodiment.
Figure 5:
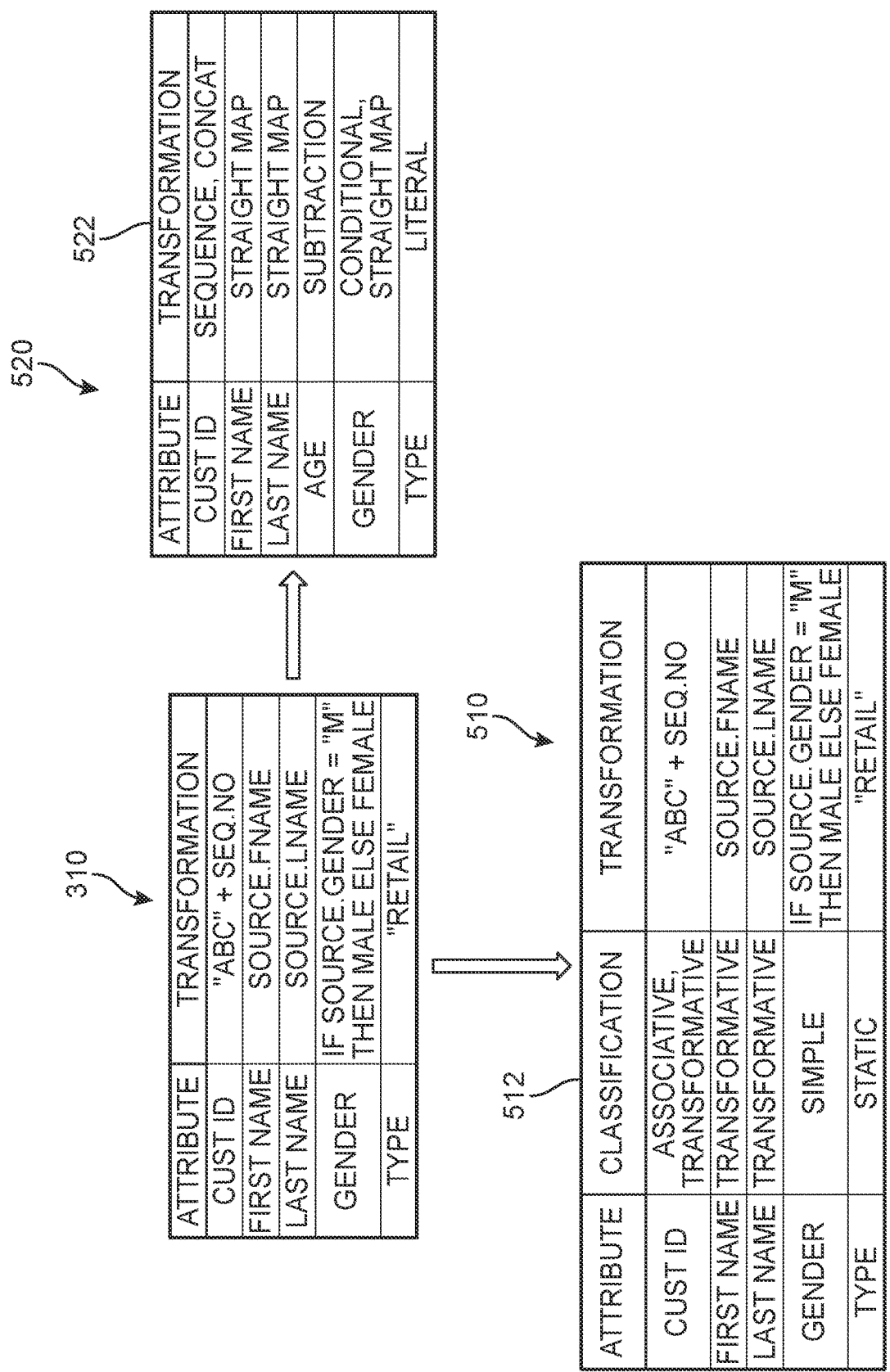
FIG. 5 is a schematic flow diagram of an embodiment of outputs by the attribute classification module and the relationship determination module, according to an embodiment.

Additional details regarding the classification module and the relationships module and their operations are now given with reference to FIGS. 3, 4, and 5. In FIG. 3, an embodiment of an attribute classification process 300 is shown, and in FIG. 4, an embodiment of an inter-relationship determination process 400 is shown. FIG. 5 then depicts examples of outputs of each of these processes. As shown in FIG. 3, input in the form of a set of extracted features 310 from the transformation design can be received at the classification module. The features are shown in FIG. 3 in a table in which two headers (shown as "attribute", along with the attribute's transformation design) and their associated extracted data values are provided. Simply for purposes of illustration, in this example, the attributes are listed as "Cust ID", "First Name", "Last Name", "Gender", and "Type". In this example, the extracted features all fall under and/or represent a single entity (e.g., customer), but in other examples, the entity can vary. In some embodiments, the classification module can use feature engineering techniques such as feature creation, transformations, feature extraction, and feature selection, to prepare the data for consumption in the classification module's ML model. As other non-limiting examples, techniques such as imputation, discretization, categorical encoding, feature splitting, handling outliers, variable transformations, scaling, and other can also be used.

For example, the classification module can perform filtering out of the extracted features in a first stage 320, such as filtering of verbose words, static literals, etc., which are not relevant to the ML model, or not required for the prediction. This filtered version of the extracted features can be cross-referenced with attribute metadata in a second stage 330 to filter out attribute names and improve the model's accuracy. The cross-referenced information can then be used to generate a data catalog based on the design in a third stage 340. An example of a first data catalog 350 is depicted in FIG. 3, which comprises a table with five headers ("attribute" with five possible categories: "if else", "concat", "literal", "straight map", and "join") though other categories may also be used. In this case, it can be seen that for each attribute from the inputted data, a cross-referenced value of either zero or one (weights that help in the prediction of which class the attribute falls into) is indicated across the five categories. This information is submitted to a first artificial intelligence (AI) model 360, which can generate a dataset represented in FIG. 3 by a first output 370, that can be used by the classification module to determine the label that should be assigned to each attribute. In general, an attribute refers to a property or characteristic of an entity or relationship type that is of interest to an organization, such that an attribute describes an entity type and the attribute is a property of an entity type. In such cases, an entity can refer to a general term for a category or instance of a person, a place, an object, an event, or a concept in the user environment about which the organization wishes to maintain data.

In different embodiments, the ML model that performs transformation analysis for classification can classify the input design attributes into one or more of at least four attribute types, including (1) Simple (e.g., or an attribute that cannot be broken down into smaller components that are meaningful to the organization), (2) Static (i.e., having a predefined set of values, has an unchanging state value, e.g., a retail bank will always have the attribute of retail), (3) Transformative (e.g., attributes composed of other attributes, derived, or multivalued, etc.), and (4) Associative (e.g., referential integrity key attributes, or an entity type that associates the instances of one or more entity types and contains attributes that are peculiar to the relationship between those entity instances). The ML model that performs transformation analysis for classification can apply any suitable classification technique. The same ML model can be trained by supervised learning with labeled data.

The attribute type that is selected by the classification module can become an input for the next stage. In other words, the classification module can predict an attributes classification class (label) that can be required for further processing. Referring briefly to FIG. 5, a first example 510 of the labels selected and produced by the classification module can be seen. These labels reflect the data listed in the first output 370 of the first AI model 360 shown in FIG. 3. In other words, the table for first output 370 determined customer ID should have a value of "1" for both the associative attribute type and the transformative attribute type, but a value of "0" for both the simple attribute type and the static attribute type. Thus, in FIG. 5, for Customer ID, classification column 512 includes "Associative" and "Transformative". Similarly, the classifications for the other example attributes can be determined based on the "1" or "O" values generated by the first AI model 360 and represented by first output 370 in FIG. 3 (e.g., the table for first output 370 determined the customer's first name should have a value of "0" for all of the associative attribute type, the simple attribute type, and the static attribute type, but a value of "1" for the associative attribute type, which is then reflected in the classification column 512).

Moving now to FIG. 4, input in the form of the set of extracted features 310 from the transformation design can be received at the relationships module in what may be a concurrent process with FIG. 3, or a previous or subsequent process. In some embodiments, the relationships module can use feature engineering techniques such as feature creation, transformations, feature extraction, and feature selection, to prepare the data for consumption in the relationships module's ML model. As other non-limiting examples, techniques such as imputation, discretization, categorical encoding, feature splitting, handling outliers, variable transformations, scaling, and other can also be used.

For example, the relationships module can perform filtering out of the extracted features in a first stage 420, such as filtering of verbose words, static literals, etc. This filtered version of the extracted features can be cross-referenced with attribute metadata in a second stage 430 to filter out attribute names and improve the model's accuracy. The cross-referenced information can then be used to generate a data catalog in a third stage 440. An example of a second data catalog 450 is depicted in FIG. 4, which comprises a table with four headers ("attribute" with four possible categories: "if else", "concat", "literal", "straight map", and "join"), though other categories may also be used. In this case, it can be seen that for each attribute from the inputted data, a cross-referenced value of either zero or one is indicated across the four categories. This information is submitted to a second artificial intelligence (AI) model 460, which can generate a dataset, represented in FIG. 4 by a second output 470, that can be used by the relationships module to discern and identify the interrelationships between the various attributes based on the design provided.

In different embodiments, the ML model that performs transformation analysis for attribute relationships is configured to map out functional interrelationships between each possible combination of attributes, including one or more of at least four (1) arithmetic, (2) sequence, (3) literal, and (4) concat function labels. In some embodiments, a look-up or join label, as well as "minus" and "plus" can also be included. More generally, in some embodiments, the relationship can be based on one of concatenation, lookup, literal, sequence, arithmetic, subtraction, and addition. Thus, the model can determine which transformation is being performed on a particular attribute and/or how the attribute is being populated. In addition, the second AI model 460 can predict the various transformation functions based on the design using logarithmic regression techniques. In different embodiments, interrelationships between various attributes can defined by a transformation function by using the design metadata (attributes) and their associated transformation functions (e.g., see FIG. 5 example of attributes and transformation functions) to train the logistic regression model, which can then be used to predict the transformation function for new/further design attributes, which define the interrelationships. Thus, the relationships module can extract features from the transformation design, perform feature engineering to prepare the extracted features for consumption in the second AI model 460, and recommend transformation functions for each attribute that can be required for further processing.

Referring briefly to FIG. 5, a second example 520 of the labels identified and produced by the relationships module can be seen. These labels reflect the data listed in the second output 470 of the second AI model 460 shown in FIG. 4. In other words, the table for second output 470 determined customer ID should have a value of "1" for the sequence label and the concat label, but a value of "0" for the arithmetic and literal function labels. Thus, in FIG. 5, for Customer ID, a transformation function column 522 includes only "Sequence" and "Concat". Similarly, the transformation functions for the other example attributes can be determined based on the "1" or "0" values generated by the second AI model 460 and represented by second output 470 in FIG. 4 (e.g., the table for second output 470 determined the customer's type should have a value of "0" for the arithmetic, sequence, and concat function labels, but a value of "1" for the literal function label, which is then reflected in the transformation function column 522).

Figure 6:
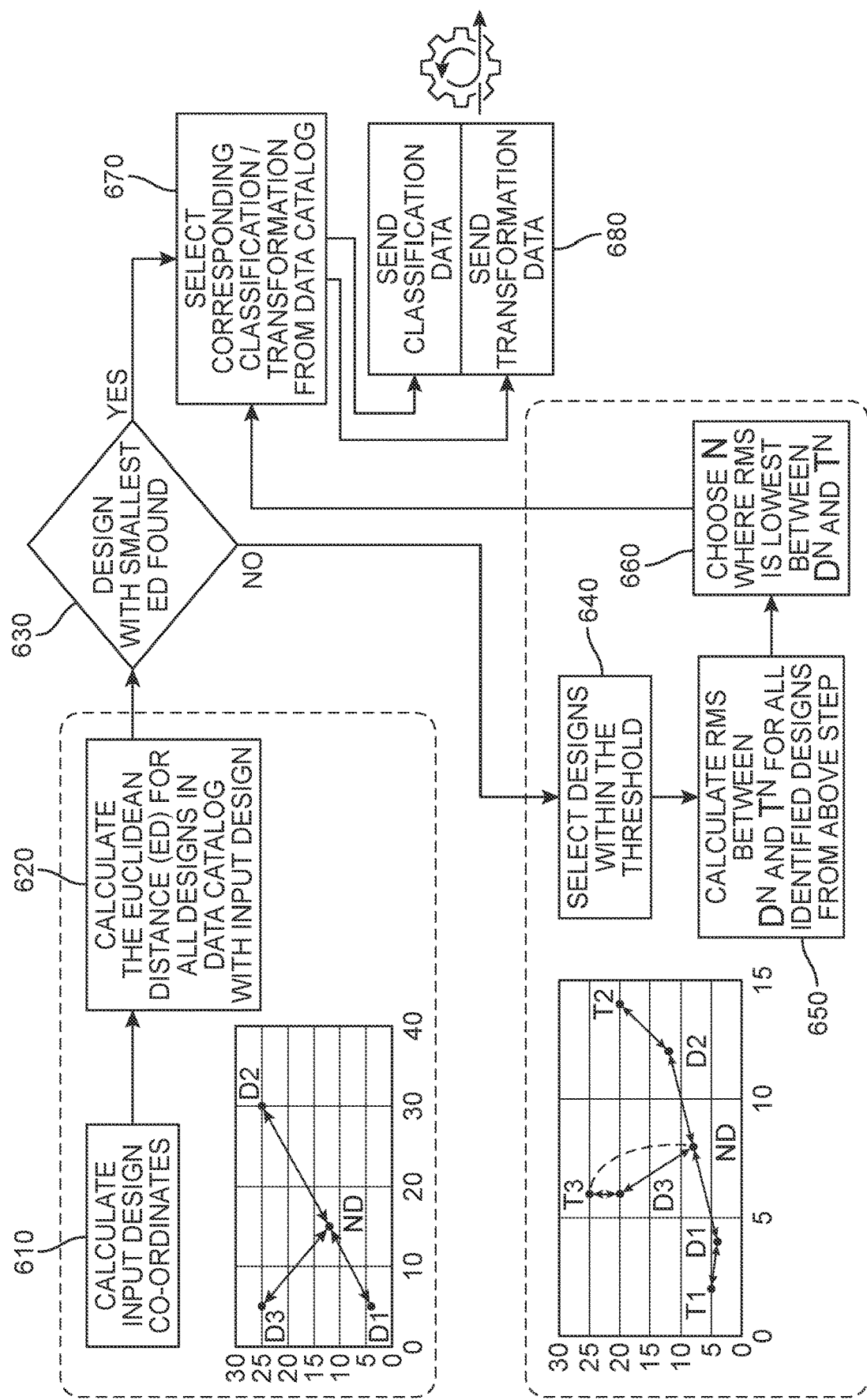
FIG. 6 is a schematic flow diagram showing a process of selection of attribute types and transformation functions using artificial intelligence models, according to an embodiment.

A schematic flow diagram showing an embodiment of a process 600 for machine learning in the classification module and the relationships module is presented in FIG. 6. At a first stage 610, input design coordinates can be calculated by the system. For example, in some embodiments, the input design coordinates are calculated using the input design metadata, for which test data is to be generated and then shared with the attribute classification module and the attribute relationship determination module. In some embodiments, the metadata of the input transformation design, for which test data is to be generated, can be acquired. Then, a library (e.g., Python Faker) can be used to assign dummy test data to the attributes. The attributes with dummy values assigned then can become the input coordinates. These can then be extracted as features and act as input coordinates (to feed into the relationships module and/or the classification module).

At a second stage 620, the system can perform a loop through the data catalog matrix (see FIGS. 3 and 4) and calculate the Euclidean Distance (ED) for all designs, where the ED can be understood to refer to the ED between each of the sub-components within a design or transformation. Thus, the ED is calculated for all new designs within predesignated thresholds based on the current design parameters.

At a third stage 630, the ED for the new design is compared to the ED for the current data catalog designs and the design with closest or smallest ED is selected. In some embodiments, there can be more than one set within the selected thresholds, and the comparison is performed in order to determine the classification class and transformation function that are nearest to the current design based on the smallest ED. In one example, a classification class and a transformation function corresponding to the design is chosen in a seventh stage 670. At an eighth stage 680, the classification class and transformation function data that have been identified are passed to or fed to the data engine. Thus, the ED allows the system to determine, from a plurality of options, the nearest or most similar classification class and transformation function relative to the current design metadata.

In cases where there are multiple designs within the defined threshold the module can additionally select designs falling under a given threshold in a fourth stage 640, and then calculate the root mean square (RMS) of the ED between DN and TN for all identified designs from the above steps in a fifth stage 650. The variable T is calculated for all designs within the threshold. If there are multiple designs detected within threshold, then one dimension D, is not enough to derive the closest one and at least two variables will be required. The "N" that has the lowest RMS is chosen in a sixth stage 660. Finally, the modules choose a classification class and a transformation function corresponding to the design with lowest RMS (based on output from sixth stage 660) in a seventh stage 670, allowing for a kind of intelligent tie-breaker operation. At an eighth stage 680, this classification class and transformation function data are passed to the data engine. It can be appreciated that each of these calculations are based on techniques that cannot be performed manually, as they are programmatic and computationally intensive.

For purposes of illustration, one example of a pseudocode for performing some of the operations described herein is provided below:

```
import numpy as np
import pandas as pd
from sklearn.model_selection import train_test_split
from sklearn.linear_model import LogisticRegression
#Read in the data
df=pd.read_csv("data.csv")
#Split the data into X (features) and y (labels)
X=df.drop("target", axis=1)
y=df["target"]
#Split the data into train and test sets
X_train, X_test, y_train, y_test=train_test_split(X, y,
    test_size=0.2,
    random_state=42)
#Create the model
model=LogisticRegression(multi_class='multinomial',
    solver='lbfgs')
#Train the model on the training data
model.fit(X_train, y_train)
#Make predictions on the test data
y_pred=model.predict(X_test)
```

Figure 7:
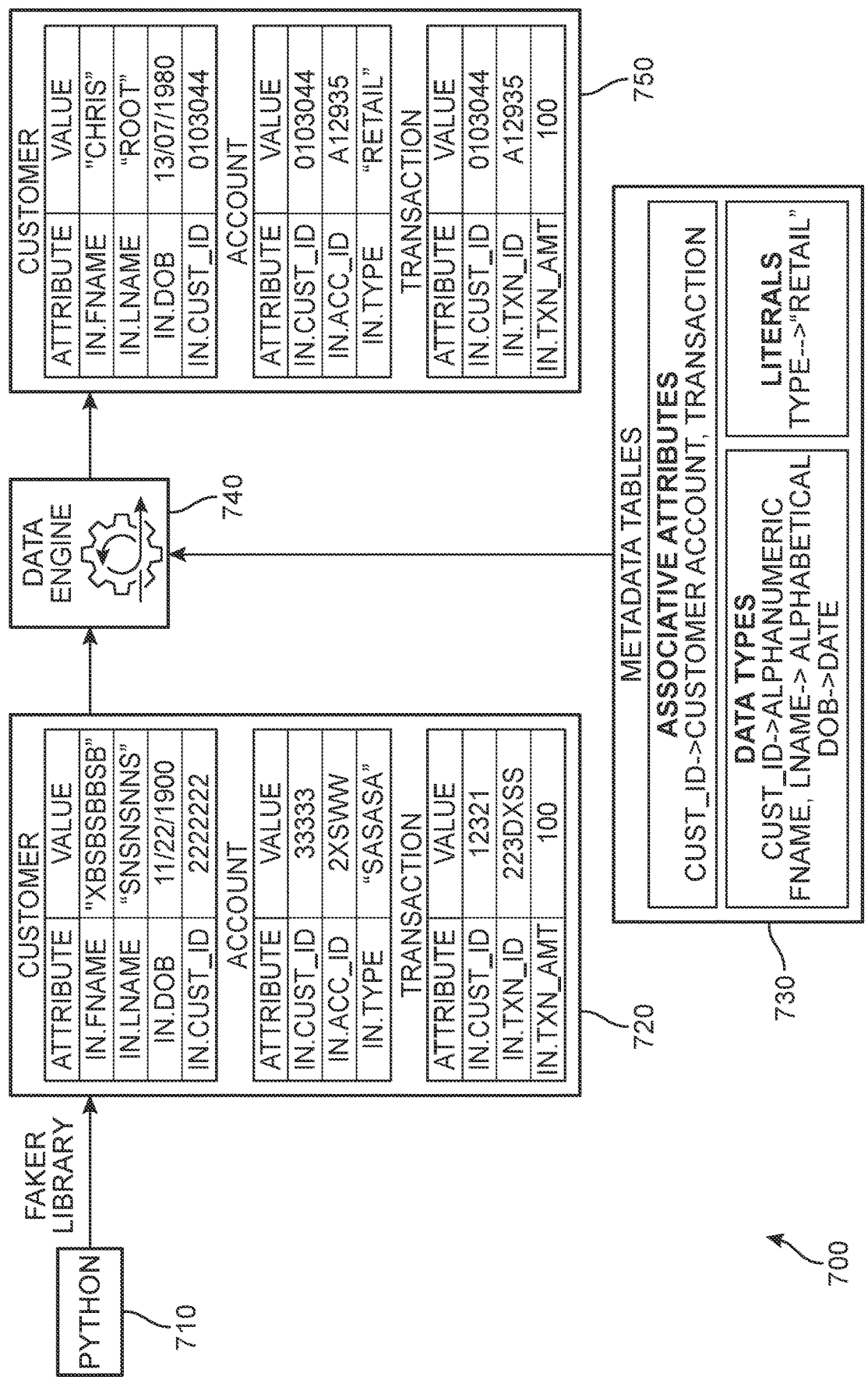
FIG. 7 is a schematic flow diagram of a process of generating test data using a data engine, according to an embodiment.

Additional details regarding the data engine are now provided with reference to a data engine diagram 700 in FIG. 7. As a general matter, the data engine is configured to generate a specific set of records to meet the design, transformation, and testing requirements for each particular attribute. In FIG. 7, a faker library 710 associated with a programming language can be used to supply a first group of data 720 directed to the various entities for this system. In this example, three entities are included (customer, account, transaction). For each entity, a dataset is provided in which attributes for the entity, and corresponding value, are identified. The first group of data is inputted to a data engine 740, which employs an algorithm to process this group of data. In addition, the data engine 740 can receive a set of metadata tables 730, which can describe functions for different schemas or classifications (e.g., associative attributes, data types, literals, string, integer, etc.) as described earlier. In different embodiments, the data engine 740 can also include a data enhancement wrapper program. This program can reside atop of a Python (or other programming language) data generator or 'Faker' program. The data engine 740 can then enrich the faker data with the derived transformation metadata obtained from both the classification module and the relationships module, as well as the attribute metadata (e.g., metadata tables 730) received as part of the design. In other words, metadata and the outputs of the modules can be used by the data engine 740 to help derive the test data.

In some embodiments, the data engine 740 is configured to automatically create design-specific data sets, bypassing the conventional need to mock-up data. In different embodiments, the data engine 740 can process the two sources of data and implement a set of sample rules to the data to generate its output. For example, the data engine 740 can apply the same value for all associative attributes in all input datasets. In another example, the data engine 740 can populate and/or update values as per data types in the metadata tables. In yet another example, the data engine 740 can ensure 50% of records (or some other preselected threshold) have the values as specified in the literals metadata table. In one example, the data engine 740 can ensure a negative test record is generated for every scenario in the input datasets. In another example, the data engine 740 can ensure that all records that are linked to a specific key value should be consistent across multiple data sets or have the same value (e.g., customer ID can be a key value, and records for that customer should always have the same/consistent customer ID in order to join these records). An example of an output 750 of the data engine 740 is shown in FIG. 7, showing the capacity of the system to ensure data integrity across multiple entities (e.g., key attributes, such as customer ID "in.cust_id", and account ID "in.acc_id", remain consistent over the three records).

For purposes of reference, an example of a script for input design is provided below:

```
PS    c:\Users\username\enrichdatasystem\inputs>cat
    design.csv
Attribute, Transformation
Cust ID, "ABC"+seq. no
First Name, source.fname
Last Name, source. l name
```

Gender,if source.gender="M" then male el se female
Type, "Retail"
PS C:\Users\username enrichdatasystem \inputs>
PS C:\Users\username\enrichdatasystem\inputs>cat att metadata.csv
Attribute, Datatype
fname,string
lname, string
gender,character
type,string
dob,date In addition, an example of the first ML model and/or relationships module scripts for intermediate attribute classification and transformation data is provided below:
PS c:\Users\username\enrichdatasystem\scripts>./tac.ksh
PS C:\Users\username\enrichdatasystem\scripts>./tar.ksh
PS c:\Users\username\enrichdatasystem\scripts>
PS C:\Users\username\enrichdatasystem\intermediate>cat tac_tar.csv
Attribute, Type, Transformation,Parameters
Full_Name, Transformative, Concat, I ookup,in.fname, in. lname
Age, Transformative, Minus, Date( ),in.dob
Type, Static, Literal,"Retail"
Cust_ID,Associative, Sequence,NA
PS C:\Users\username\enrichdatasystem \intermediate>

An example of an execute data engine prep script also follows below:
PS C:\Users\username\enrichdatasystem\scripts>./de_prep.ksh Furthermore, an example of an intermediate attribute metadata generation script is provided below:
PS C:\Users\username\enrichdatasystem\intermediate>cat assoc metadata.csv
Attribute, Input Dataset
Cust ID,customer
Cust_ID, account
Cust_ID, transaction
PS C:\Users\username\enrichdatasystem\intermediate>cat literal metadata.csv
Attribute, Input Dataset, Literal Value
type, customer, "retail"
gender, customer, "M/F/NA"
PS C:\Users\username\enrichdatasystem \intermediate>

In addition, an example of an execute data engine enrich script can be represented by:
PS C:\Users\username\enrichdatasystem \scripts>./de_enrich.ksh Finally, the enriched test data generation script can be represented by:
PS C:\Users\username\enrichdatasystem\output>cat account.csv
Attribute, Value
in.cust_id, 103044
in.acc_id,A12935
in.type, "Retail"
PS c:\Users\username\enrichdatasystem\output>cat transaction.csv
Attribute, Value
in.cust_id, 103044
in.txn_id,A12935
in.txn_amt, 100
PS c:\Users\username\enrichdatasystem\output>cat customer.csv
Attribute, Value
in.fname, "Chris"
in. lname, "Root"
in.DOB, 13/07/1980
in.cust_id, 103044
PS C:\Users\username\enrichdatasystem\output>

As described herein, the proposed systems and methods offer a mechanism by which to generate robust, design-compliant test data for cloud migrations. It may be appreciated that any defects in a new code can result in serious consequences. Typically, once a developer writes the cloud infrastructure code in their selected programming language, several operational and compliance tests must be run, which often reveal a multitude of issues. However, because of the current dependence on randomly generated test data many of these issues are only generated and noted after deployment of the software to the live, operational environment. Therefore, testing is a key stage in the deployment process.

The proposed embodiments remove the presence of manual errors, and allow for an accelerated testing paradigm that can be efficiently implemented prior to actual 'live' deployment. Thus, any errors will not lead to any real-world harm. By providing a route by which tailored, metadata-driven transformation test data for cloud migration can be procured without the need for manual creation or manual modifications to randomly generated data, the quality of data used for testing is also greatly enhanced, thereby greatly enhancing the quality of testing and the removal of faults in software applications. Similarly, an increased compliance to design leads to reduction in defect leakage across various testing phases. In addition, the test data enables significant acceleration in the execution of testing operations due to the resulting reduction in defect management overhead.

Figure 8:
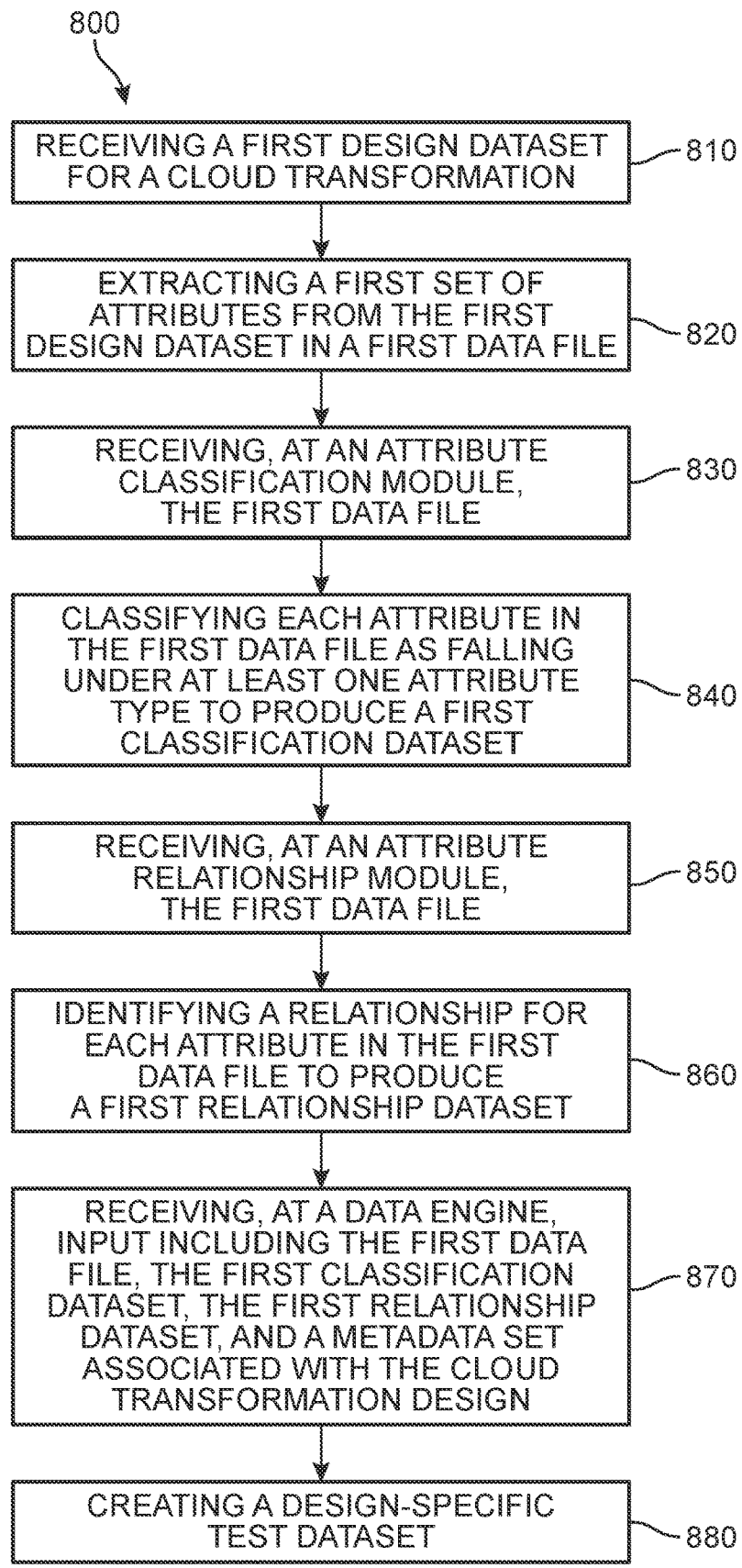
FIG. 8 is a flow chart depicting a method for generating enriched test data for cloud transformation designs, according to an embodiment.

FIG. 8 is a flow chart illustrating an embodiment of a method 800 of producing enriched test data. The method 800 includes a first step 810 of receiving, at a feature extraction module, a first design dataset for a cloud transformation, and a second step 820 of extracting, at the feature extraction module, at least a first set of attributes from the first design dataset in a first data file. In addition, the method 800 includes a third step 830 of receiving, at an attribute classification module, the first data file, and a fourth step 840 classifying, at the attribute classification module, each attribute in the first data file as falling under at least one attribute type to produce a first classification dataset. A fifth step 850 includes receiving, at an attribute relationship module, the first data file, and a sixth step 860 includes identifying, at the attribute relationship module, a transformation relationship for each attribute in the first data file to produce a first relationship dataset. Furthermore, the method 800 includes a seventh step 870 of receiving, at a data engine, input including the first data file, the first classification dataset, the first relationship dataset, and a metadata set associated with the cloud transformation design, and an eighth step 880 of automatically creating, at the data engine and based on the input, a design-specific test dataset for performing tests on software undergoing a cloud transformation.

In other embodiments, the method may include additional steps or aspects. In some embodiments, the classification of each attribute can further include calculating a Euclidean Distance (ED) for each design in the first design dataset and obtaining a first ED set, selecting a first design in the first design dataset based on the ED for the first design corresponding to the smallest distance in the first ED set, and classifying each attribute as an attribute type based on the selected first design. In another example, identification of the transformation relationship for each attribute further can also include steps of calculating a Euclidean Distance (ED) for each design in the first design dataset and obtaining a first ED set, selecting a first design in the first design dataset based on the ED for the first design corresponding to the smallest distance in the first ED set, and identifying each transformation relationship based on the selected first design.

In some embodiments, the attribute type can include one of an associative label, transformative label, simple label, and a static label. In another embodiment, the transformation relationship is based on one of concatenation, lookup, literal, sequence, arithmetic, subtraction, and addition. In some embodiments, the method also includes steps of receiving, at a machine learning model for the attribute classification module, a first recommendation from a reviewer of the design-specific test dataset, and re-training the machine learning model based on the first recommendation to improve classification accuracy. In another example, the method can also include receiving, at a machine learning model for the attribute relationship module, a first recommendation from a reviewer of the design-specific test dataset, and re-training the machine learning model based on the first recommendation to improve relationship identification accuracy.

Figure 9:
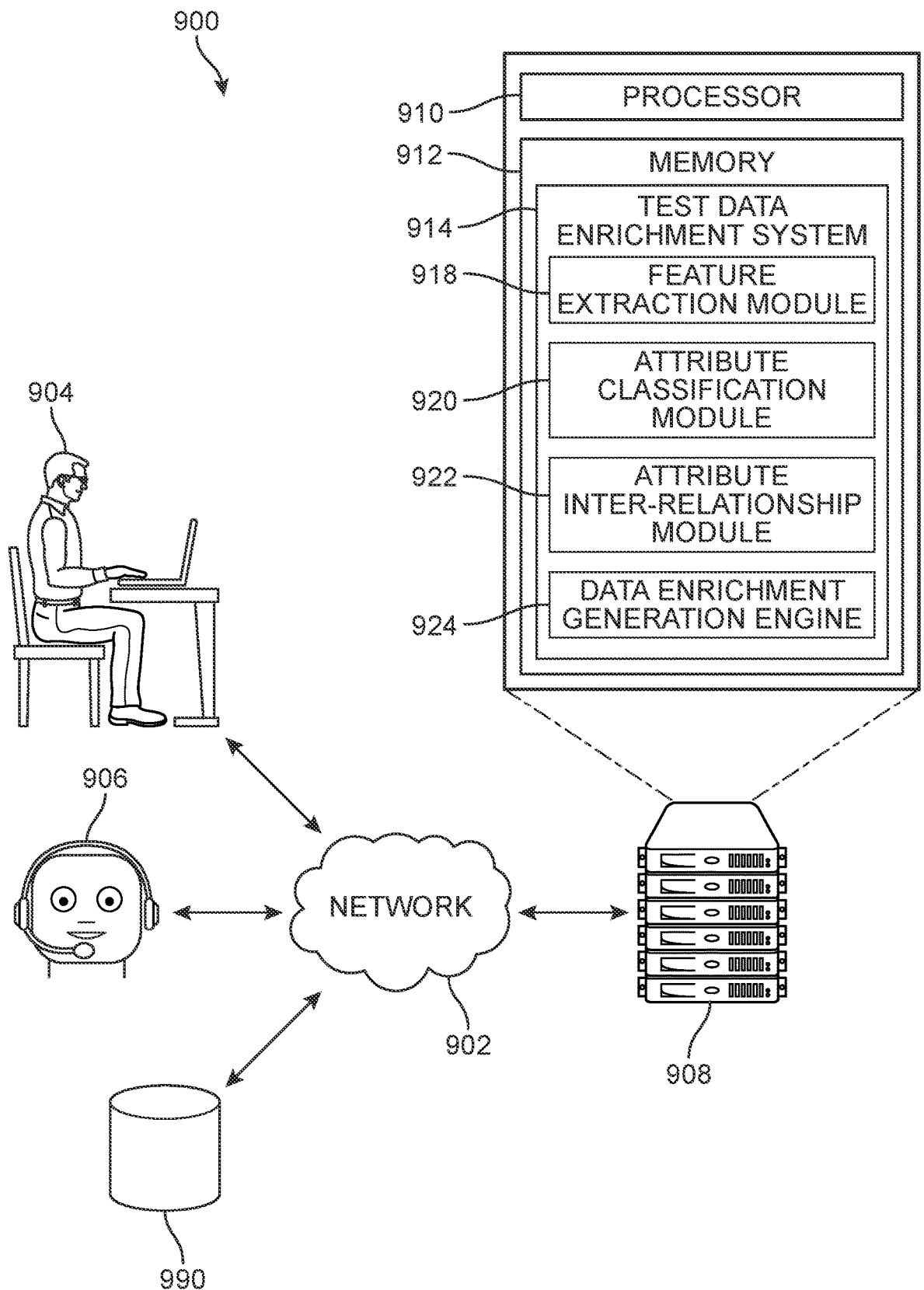
FIG. 9 is a diagram depicting example environments and components by which systems and/or methods, described herein, may be implemented.

FIG. 9 is a schematic diagram of an environment 900 for a test data enrichment system 914 ("system" 914), according to an embodiment. The environment 900 may include a plurality of components capable of performing the disclosed methods. For example, environment 900 includes a user device 904, a computing/server system 908, and a database 990. The components of environment 900 can communicate with each other through a network 902. For example, user device 904 may retrieve information from database 990 via network 902. In some embodiments, network 902 may be a wide area network ("WAN"), e.g., the Internet. In other embodiments, network 906 may be a local area network ("LAN").

As shown in FIG. 9, components of the system 914 may be hosted in computing system 908, which may have a memory 912 and a processor 910. Processor 910 may include a single device processor located on a single device, or it may include multiple device processors located on one or more physical devices. Memory 912 may include any type of storage, which may be physically located on one physical device, or on multiple physical devices. In some cases, computing system 908 may comprise one or more servers that are used to host the system.

While FIG. 9 shows one user device, it is understood that one or more user devices may be used. For example, in some embodiments, the system may include two or three user devices. In some embodiments, the user device may be a computing device used by a user. For example, user device 904 may include a smartphone or a tablet computer. In other examples, user device 904 may include a laptop computer, a desktop computer, and/or another type of computing device. The user devices may be used for inputting, processing, and displaying information. Referring to FIG. 9, environment 900 may further include database 990, which stores test data, training data, metadata, design data, classification data, attribute data, feedback data for iterative training of the ML models (training cycle), relationship data, and/or other related data for the components of the system as well as other external components. This data may be retrieved by other components for system 914. As discussed above, system 914 may include a feature extraction module 918, an attribute classification module 920 (e.g., classification module), an attribute inter-relationship module 922 (e.g., relationships module), and an intelligent data enrichment generation engine 924 (e.g., data engine). Each of these components may be used to perform the operations described herein.

For purposes of this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons/options or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with the user interface, or other such information presentation.

It should be understood that the text, images, and specific application features shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

The methods, devices, and processing described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method for producing enriched test data, the method comprising:
   receiving, at a feature extraction module, a first design dataset for a cloud transformation;
   extracting, at the feature extraction module, at least a first set of attributes from the first design dataset in a first data file;
   receiving, at an attribute classification module, the first data file;
   classifying, at the attribute classification module, each attribute in the first data file as falling under at least one attribute type to produce a first classification dataset;
   receiving, at an attribute relationship module, the first data file;
   identifying, at the attribute relationship module, a transformation relationship for each attribute in the first data file to produce a first relationship dataset;
   receiving, at a data engine, input including the first data file, the first classification dataset, the first relationship dataset, and a metadata set associated with the cloud transformation design; and
   automatically creating, at the data engine and based on the input, a design-specific test dataset for performing tests on software undergoing a cloud transformation.

2. The method of claim 1, wherein the classification of each attribute further comprises:
   calculating a Euclidean Distance (ED) for each design in the first design dataset and obtaining a first ED set;
   selecting a first design in the first design dataset based on the ED for the first design corresponding to the smallest distance in the first ED set; and
   classifying each attribute as an attribute type based on the selected first design.

3. The method of claim 1, wherein identification of the transformation relationship for each attribute further comprises:
   calculating a Euclidean Distance (ED) for each design in the first design dataset and obtaining a first ED set;
   selecting a first design in the first design dataset based on the ED for the first design corresponding to the smallest distance in the first ED set; and
   identifying each transformation relationship based on the selected first design.

4. The method of claim 1, wherein the attribute type includes one of an associative label, transformative label, simple label, and a static label.

5. The method of claim 1, wherein the transformation relationship is based on one of concatenation, lookup, literal, sequence, arithmetic, subtraction, and addition.

6. The method of claim 1, further comprising:
   receiving, at a machine learning model for the attribute classification module, a first recommendation from a reviewer of the design-specific test dataset; and
   re-training the machine learning model based on the first recommendation to improve classification accuracy.

7. The method of claim 1, further comprising:
   receiving, at a machine learning model for the attribute relationship module, a first recommendation from a reviewer of the design-specific test dataset; and
   re-training the machine learning model based on the first recommendation to improve relationship identification accuracy.

8. A non-transitory computer-readable medium storing software comprising instructions executable by one or more computers which, upon such execution, cause the one or more computers to produce enriched test data by performing the following:
   receive, at a feature extraction module, a first design dataset for a cloud transformation;
   extract, at the feature extraction module, at least a first set of attributes from the first design dataset in a first data file;
   receive, at an attribute classification module, the first data file;
   classify, at the attribute classification module, each attribute in the first data file as falling under at least one attribute type to produce a first classification dataset;
   receive, at an attribute relationship module, the first data file;
   identify, at the attribute relationship module, a transformation relationship for each attribute in the first data file to produce a first relationship dataset;
   receive, at a data engine, input including the first data file, the first classification dataset, the first relationship dataset, and a metadata set associated with the cloud transformation design; and automatically create, at the data engine and based on the input, a design-specific test dataset for performing tests on software undergoing a cloud transformation.

9. The non-transitory computer-readable medium storing software of claim 8, wherein the instructions further cause the one or more computers to:
calculate a Euclidean Distance (ED) for each design in the first design dataset and obtaining a first ED set;
select a first design in the first design dataset based on the ED for the first design corresponding to the smallest distance in the first ED set; and
classify each attribute as an attribute type based on the selected first design.

10. The non-transitory computer-readable medium storing software of claim 8, wherein the instructions further cause the one or more computers to:
calculate a Euclidean Distance (ED) for each design in the first design dataset and obtaining a first ED set;
select a first design in the first design dataset based on the ED for the first design corresponding to the smallest distance in the first ED set; and
identify each transformation relationship based on the selected first design.

11. The non-transitory computer-readable medium storing software of claim 8, wherein the attribute type includes one of an associative label, transformative label, simple label, and a static label.

12. The non-transitory computer-readable medium storing software of claim 8, wherein the transformation relationship is based on one of concatenation, lookup, literal, sequence, arithmetic, subtraction, and addition.

13. The non-transitory computer-readable medium storing software of claim 8, wherein the instructions further cause the one or more computers to:
receive, at a machine learning model for the attribute classification module, a first recommendation from a reviewer of the design-specific test dataset; and
re-train the machine learning model based on the first recommendation to improve classification accuracy.

14. The non-transitory computer-readable medium storing software of claim 8, wherein the instructions further cause the one or more computers to:
receive, at a machine learning model for the attribute relationship module, a first recommendation from a reviewer of the design-specific test dataset; and
re-train the machine learning model based on the first recommendation to improve relationship identification accuracy.

15. A system for producing enriched test data comprising one or more computers and one or more storage devices storing instructions that are operable, when executed by the one or more computers, to cause the one or more computers to:
receive, at a feature extraction module, a first design dataset for a cloud transformation;
extract, at the feature extraction module, at least a first set of attributes from the first design dataset in a first data file;
receive, at an attribute classification module, the first data file;
classify, at the attribute classification module, each attribute in the first data file as falling under at least one attribute type to produce a first classification dataset;
receive, at an attribute relationship module, the first data file;
identify, at the attribute relationship module, a transformation relationship for each attribute in the first data file to produce a first relationship dataset;
receive, at a data engine, input including the first data file, the first classification dataset, the first relationship dataset, and a metadata set associated with the cloud transformation design; and
automatically create, at the data engine and based on the input, a design-specific test dataset for performing tests on software undergoing a cloud transformation.

16. The system of claim 15, wherein the instructions further cause the one or more computers to:
calculate a Euclidean Distance (ED) for each design in the first design dataset and obtaining a first ED set;
select a first design in the first design dataset based on the ED for the first design corresponding to the smallest distance in the first ED set; and
classify each attribute as an attribute type based on the selected first design.

17. The system of claim 15, wherein the instructions further cause the one or more computers to:
calculate a Euclidean Distance (ED) for each design in the first design dataset and obtaining a first ED set;
select a first design in the first design dataset based on the ED for the first design corresponding to the smallest distance in the first ED set; and
identify each transformation relationship based on the selected first design.

18. The system of claim 15, wherein the attribute type includes one of an associative label, transformative label, simple label, and a static label.

19. The system of claim 15, wherein the transformation relationship is based on one of concatenation, lookup, literal, sequence, arithmetic, subtraction, and addition.

20. The system of claim 15, wherein the instructions further cause the one or more computers to:
receive, at a machine learning model for the attribute classification module, a first recommendation from a reviewer of the design-specific test dataset; and
re-train the machine learning model based on the first recommendation to improve classification accuracy.

* * * * *